March 21, 1933.                S. L. HANSSEN                1,902,233
                                WEIGHING SCALE
                              Filed Jan. 5, 1931
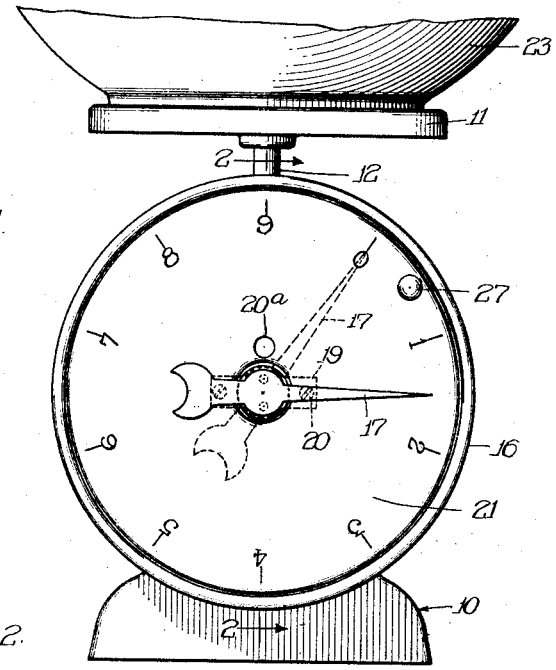
Fig.1
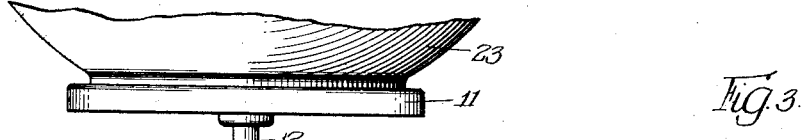
Fig.2                                          Fig.3
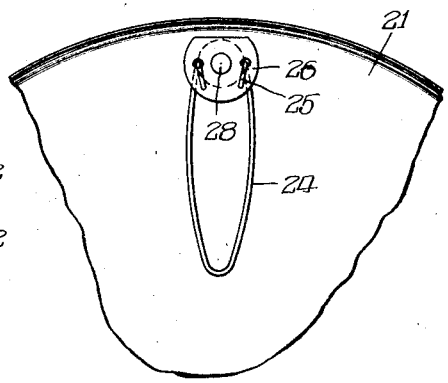
Inventor:
Stan L. Hanssen,
By Charidall Park & Carlson
                          Attys.

Patented Mar. 21, 1933

1,902,233

UNITED STATES PATENT OFFICE

STAN L. HANSSEN, OF CHICAGO, ILLINOIS, ASSIGNOR TO HANSON SCALE COMPANY, OF CHICAGO, ILLINOIS, A CORPORATION OF ILLINOIS

WEIGHING SCALE

Application filed January 5, 1931. Serial No. 506,691.

The invention relates generally to weighing scales and more particularly to scales of the movable dial type wherein the dial may be adjusted at will to compensate for an initial load placed on the weighing mechanism and permit additional weight subsequently placed on the mechanism to be read directly on the dial.

In the use of such scales the dial often tends to move away from the desired set position due to lack of balance in the dial, and the general object of the present invention is to provide a scale of this character having simple and effective means for maintaining the dial at the desired setting.

Other objects and advantages will become apparent from the following description taken in connection with the accompanying drawing, in which:

Figure 1 is a front elevational view of a scale embodying the invention in its preferred form.

Fig. 2 is a side elevational view of the scale shown in Fig. 1, the view being taken partially in section along the line 2—2 of Fig. 1.

Fig. 3 is an enlarged fragmental portion of the inner side of the movable dial.

In the preferred form chosen for disclosure herein the invention is embodied in a scale having a casing 10 with a platform 11 above the casing supported on a standard 12 extending downwardly into the casing. The standard 12 is carried upon conventional weighing mechanism mounted within the casing and including a movable rack 13 adjacent the forward side of the casing. Actuation of the weighing mechanism by a movement of the platform 11 serves to impart corresponding movement to the rack 13 which engages a pinion 14 mounted on a horizontal shaft 15 extending forwardly from the scale casing through an inclined wall 16 and carrying at its outer end a pointer 17.

The inner end of the shaft 15 is rotatably supported in a wall 16ª within the casing 10, while a second support for the shaft is provided by a bearing 18 located outside of the wall 16. The bearing, in the present instance, comprises a bar 19 through which the shaft extends and the bar is secured in position on the wall 16 by screws 20 extending through the wall 16 and screw-threaded into the wall 16ª in a conventional manner not herein shown.

Between the wall 16 and the pointer 17 a disk-like dial 21 is positioned, said dial having a central opening by means of which the dial is rotatably supported upon the bar 19. The rotatable mounting for the dial 21 is preferably provided by a pair of disks 22 positioned on opposite sides of the central opening of the dial and fixed together upon the bar 19 to provide a suitable bearing for the dial. In securing the bar 19 in position on the wall 16, access may be had to the screws 20 through an opening 20ª (Fig. 1) in the dial 21.

When an initial weight such as a container 23 has been placed on the platform 11 so as to move the pointer 17 to the position shown in dotted outline in Fig. 1, the dial 21 may be shifted until the zero of the dial corresponds with the position of the pointer. The substance to be weighed may then be placed in the container 23 in the desired quantity, and the weight of this substance may be read directly on the dial 21 without the necessity for subtracting the weight of the container 23.

Various conditions such as uneven balancing of the dial tend to cause movement thereof from the desired adjusted position, and in accordance with the present invention means is provided which acts to prevent such undesired movement of the dial. In the preferred form shown, this means acts frictionally between the dial 21 and the wall 16 and comprises a spring 24 located in a concealed position between the wall and the dial and secured to the dial. The spring 24, in the present case, is of the leaf spring type formed from an elongated strand of wire having its ends 25 projecting through a plate 26 and reversely bent on the other side thereof. Any other desired form of spring may be used.

Means is usually provided on such scales for grasping and moving the dial, and to simplify the manufacture of the scale this means and the spring 24 are preferably of such a construction that they may be secured to the dial in a single operation. To this end a handle 27 has a reduced portion 28 thereon adapted to project through the dial 21 from the outside thereof and through an opening in the plate 26. Thus, to secure the spring 24 and the handle 27 to the dial is only necessary to upset or rivet the end of the portion 28. It will be noted that the spring 24 is positioned between the plate 26 and the dial whereby to obtain a secure mounting for the spring. When thus secured the spring 24 extends angularly across the space between the dial 21 and the wall 16 and its free end bears frictionally against the wall 16 so that it acts as a brake and retards movement of the dial.

From the foregoing it will be apparent that the invention provides simple and effective means for maintaining the movable dial in any desired position whereby to insure accuracy in the weighing operation.

I claim as my invention:

1. A scale having in combination, a casing, weighing mechanism therein, a shaft connected to said mechanism and projecting through a wall of said casing, a pointer on the end of said shaft, a dial positioned about said shaft between said pointer and said wall and mounted for rotative adjustment about the axis of said shaft, a handle for moving the dial, a spring concealed behind said dial and acting between said dial and said wall to resist movement of the dial, and a single means securing said handle and said spring to said dial.

2. A scale having in combination, a casing, weighing mechanism therein, a shaft connected to said mechanism, a pointer on the end of said shaft, a dial positioned about said shaft behind said pointer and mounted for rotative adjustment about the axis of said shaft, a handle for moving said dial, a spring acting frictionally between said dial and said casing to resist movement of said dial, and a single means securing the spring and the handle on said dial.

In testimony whereof, I have hereunto affixed my signature.

STAN L. HANSSEN.